US008281895B2

(12) United States Patent  
Gassner

(10) Patent No.: US 8,281,895 B2
(45) Date of Patent: Oct. 9, 2012

(54) STOP ELEMENT FOR A SECURING DEVICE

(75) Inventor: Stefan Gassner, Missen (DE)

(73) Assignee: fazinatour Touristik-Training-Event GmbH, Immenstadt (DE)

( * ) Notice: Subject to any disclaimer, the term of this patent is extended or adjusted under 35 U.S.C. 154(b) by 503 days.

(21) Appl. No.: 12/501,005

(22) Filed: Jul. 10, 2009

(65) Prior Publication Data

US 2010/0012425 A1 Jan. 21, 2010

(30) Foreign Application Priority Data

Jul. 16, 2008 (DE) .................... 10 2008 033 431

(51) Int. Cl.
*A62B 35/00* (2006.01)

(52) U.S. Cl. .................... 182/19; 182/3; 182/8

(58) Field of Classification Search .............. None
See application file for complete search history.

(56) References Cited

U.S. PATENT DOCUMENTS

| | | | |
|---|---|---|---|
| 3,177,543 A * | 4/1965 | Fountain | 188/65.2 |
| 4,034,828 A | 7/1977 | Rose et al. | |
| 4,423,796 A | 1/1984 | Sulowski et al. | |
| 4,560,029 A | 12/1985 | Dalmaso | |
| 4,657,110 A | 4/1987 | Wolner | |
| 4,846,075 A | 7/1989 | Tupper | |
| 5,156,240 A | 10/1992 | Ostrobrod | |
| 5,265,696 A | 11/1993 | Casebolt | |
| 5,316,103 A | 5/1994 | Bell et al. | |
| 5,638,919 A * | 6/1997 | Pejout | 182/192 |
| 5,855,251 A | 1/1999 | Deuer | |
| 5,924,522 A | 7/1999 | Ostrobrod | |
| 6,019,195 A | 2/2000 | Pelofi | |
| 6,056,086 A | 5/2000 | Gortan et al. | |
| 6,095,502 A * | 8/2000 | Dodge, Jr. | 254/389 |
| 6,161,647 A | 12/2000 | Braden et al. | |

(Continued)

FOREIGN PATENT DOCUMENTS

DE 10 2005 009 946 B3 7/2006

(Continued)

OTHER PUBLICATIONS

EPO Machine Translation of French reference provided only in French by Applicant; pp. 1 &2, from Jan. 1994., PDF format.*

*Primary Examiner* — Katherine W Mitchell
*Assistant Examiner* — Colleen M Chavchavadze
(74) *Attorney, Agent, or Firm* — Reinhart Boerner Van Deuren P.C.

(57) ABSTRACT

The present disclosure relates to a stop element for a securing device, with a contact element. A locking device is shiftable between unlocked and locked states. The stop element is attachable to and releasable from the securing element in the unlocked state and not releasable from the securing element in the locked state. The locking device has an actuating device which is shiftable between an active position and a passive position and when in its active position blocks the locking device in its unlocked state and is transferable into its passive position, in which the locking device is shiftable into its locked state, when the stop element is attached to the securing element. The contact element may form part of the actuating device such that the actuating device can be shifted into its passive position when the securing element contacts the contact element.

13 Claims, 6 Drawing Sheets

U.S. PATENT DOCUMENTS

| | | |
|---|---|---|
| 6,530,454 B1 | 3/2003 | Renton et al. |
| 6,945,357 B1 | 9/2005 | Flux |
| 7,007,772 B2 | 3/2006 | Argoud |
| 7,080,716 B2 | 7/2006 | Cherpitel |
| 2002/0112916 A1* | 8/2002 | Ador ................................ 182/5 |
| 2004/0129494 A1* | 7/2004 | Cherpitel ......................... 182/5 |
| 2006/0124391 A1* | 6/2006 | Jones et al. ..................... 182/36 |
| 2006/0289235 A1* | 12/2006 | Chen ............................. 182/192 |
| 2009/0200107 A1 | 8/2009 | Gassner |
| 2011/0031065 A1* | 2/2011 | Strasser ........................... 182/3 |
| 2011/0047764 A1* | 3/2011 | Strasser ...................... 24/599.5 |

FOREIGN PATENT DOCUMENTS

| | | |
|---|---|---|
| DE | 10 2006 010 898 A1 | 9/2007 |
| EP | 0363234 A1 | 4/1990 |
| EP | 1832315 A1 | 9/2007 |
| FR | 2694044 A1 | 1/1994 |
| FR | 2820641 A1 * | 8/2002 |
| WO | WO 92/07199 A1 | 4/1992 |
| WO | WO 2008/049143 A1 | 5/2008 |
| WO | WO 2008/049899 A1 | 5/2008 |

* cited by examiner

STOP ELEMENT FOR A SECURING DEVICE

CROSS-REFERENCE TO RELATED PATENT APPLICATIONS

This patent application claims the benefit of co-pending German Patent Application No. DE 102008033431.6, filed on Jul. 16, 2008, the entire teachings and disclosure of which are incorporated herein by reference thereto.

FIELD OF THE INVENTION

The present invention relates to a stop element for a securing device for preventing persons from falling. The invention also relates to a securing device with at least one such stop element.

BACKGROUND OF THE INVENTION

DE 10 2006 010 898 A1 discloses a securing device which has two stop elements, which can in each case be attached releasably to a stationary securing element and which can in each case be connected to the person to be secured by means of a connecting element. Each stop element has a contact element which is configured as a roll and on which the securing element, which is configured as a rope, comes to bear when the stop element is attached thereto, as well as a locking device which can be shifted between an unlocked state, in which the respective stop element can be attached to or released from the respective securing element, and a locked state, in which the respective stop element which is attached to the respective securing element cannot be released from the respective securing element without destroying it. Furthermore, the known securing device comprises a coupling device which is coupled to the locking devices of the two stop elements in such a manner that it blocks the locking device of one stop element in its locked state when the other locking device is in its unlocked state.

This construction of the securing device means that the risk of falling for the person secured with it can be significantly reduced. When changing from one securing element to another securing element it is necessary to change over the two stop elements. In the process, the coupling device in the known securing device prevents both stop elements from being inadvertently removed at the same time from the respective securing element, as a result of which the person would be temporarily unsecured. The known securing device thus forces the secured person to change over the stop elements consecutively, which improves safety.

WO 2008/049899 A1 discloses a development of the above-described securing device, in which the locking device of the respective stop element has an actuating lever which can be shifted between an active position and a passive position, and, when in its active position, blocks the locking device in its unlocked state and can be forced into its passive position, in which it allows the locking device to be shifted to its locked state, by the stop element being attached to the securing element. In the known stop element the actuating lever when in its active position projects into an introduction opening, through which a rope, which forms the securing element, reaches a roll which is used as the contact element when the stop element is attached to the securing element, that is, to the rope. As a result, the actuating lever is forced into its passive position when the stop element, which is configured like a carabiner, is attached to the securing rope, as a result of which it is made possible for the locking device to be shifted into its locked state. The handling of the stop element is thus simplified. At the same time, it is made more difficult to misuse the securing device, as the blocking of one stop element can only be lifted by attaching the other stop element to the securing rope when the securing device is used properly.

Furthermore, DE 10 2005 009 946 B3 discloses a securing device which consists of a harness which is fastened on the body of the user, two connecting means with one carabiner each, by means of which a displaceable and releasable connection can be made between the harness and a bearing rope, and an electronic circuit for monitoring the correct securing of the user. The electronic circuit monitors the hooking of the carabiners on the bearing rope and generates an audible warning signal as soon as at least one of the two carabiners is not hooked onto the bearing rope. Furthermore, the known securing device can be configured in such a manner that the electronic circuit blocks an opening mechanism of a carabiner by means of an electromagnetic actuating device as soon as the other carabiner is opened and/or removed from the bearing rope, as a result of which simultaneous removal of both carabiners and thus inadvertent misuse of the securing device by the user is prevented.

BRIEF SUMMARY OF THE INVENTION

Embodiments of the present invention are concerned with the problem of specifying an improved embodiment for a stop element of the type mentioned at the start or for a securing device equipped therewith, which embodiment is characterised in particular by cost-effective feasibility with a comparatively high level of functional reliability.

This problem is solved according to embodiments of the invention by the subject matter of the independent claims. Advantageous embodiments form the subject matter of the dependent claims.

Embodiments of the invention are based on the general idea of integrating the respective contact element in an actuating device, which allows the respective locking device to be released from and blocked in its unlocked state. This integration takes place in such a manner that the actuating device can be shifted into its passive position, in which it allows the locking device to be shifted into its locked state, when the stop element is attached to the securing element by placing or pressing the securing element onto the contact element. This type of construction means that a separate actuating lever, which projects into an introduction opening in the stop element when in its active position, can be omitted. In the stop element according to an embodiment of the invention, the contact element which is present anyway is used for this purpose. This is situated at the end of the introduction opening, that is, likewise in the shifting path of a securing element which is guided through the introduction opening to the contact element when the stop element is attached to the securing element. Embodiments of the invention thus use the contact element, which is in any case arranged in the shifting path or at the end of the shifting path, to transfer the respective locking device from its unlocked state to its locked state. The structure of the stop element as a whole can be simplified thereby. Furthermore, the additional actuating lever, which closes when the stop element is attached to the securing element and is moreover exposed to the risk of damage in the event of misuse, can be omitted. The functional reliability and service life of the stop element can be improved as a whole.

In an advantageous embodiment, the actuating device comprises a bearing lever which is mounted pivotably, for example on a housing of the stop element, and which is drive-coupled to the locking device. For example, the bearing lever can be coupled to a lock of the locking device, which lock can be pivoted between a locked position which is associated with the locked state of the locking device and an unlocked position which is associated with the unlocked state of the locking device. In addition or alternatively, the bearing lever can be coupled to a securing lever of the locking device, which can be pivoted between a securing position which blocks the above-mentioned lock in its locked position and an unsecuring position which allows the said lock to be pivoted between its locked position and its unlocked position. The bearing lever thus couples the actuating device to the locking device in such a manner that the locking device is blocked in its unlocked state when the actuating device is activated, that is, is shifted to its active position. The bearing lever can thus block the above-mentioned lock in its unlocked position and/or block the above-mentioned securing lever in its unlocked position when the actuating device is in its active position. This is achieved for example by special kinematics for the components which interact with each other, which kinematics allow two over-centre point positions for the bearing lever. Such over-centre point positions are stable and form the active position and the passive position of the actuating device. Between these stable positions there is a labile centre point from which the components which are coupled to each other are automatically, in particular in a spring-loaded manner, shifted into one or the other over-centre point position when the centre point is overcome.

According to another development, the actuating device can have a contact lever which has the contact element, for example in the form of a roll, or forms the contact element itself, for example in the form of a sliding contour. This contact lever is arranged adjustably in such a manner that it is arranged at the end of an introduction opening or of a shifting path for the securing element when the actuating device is in its passive position, while it projects into the introduction opening or into the shifting path when the actuating device is in its active position. This forces the contact lever to shift position when the stop element is attached to the securing element, as soon as the securing element comes into contact with the contact element and any corresponding contact forces are transmitted. The contact lever can thereby be pivoted from its position which projects into the introduction opening into its position which forms the end of the introduction opening, as a result of which the actuating device is transferred from its active position into its passive position. A functional integration of the contact element in the actuating device is thus also created by means of this contact lever.

In an advantageous development, the actuating device can have a coupling lever which couples the said contact lever to the above-mentioned bearing lever. The forced coupling which is realised in this manner means that when the locking device is shifted from its locked state to its unlocked state, the contact lever is forced into the introduction opening, that is, the actuating device is transferred from its passive position to its active position. In addition or alternatively, the said forced coupling means that the locking device is forced from its unlocked state into its locked state when the contact lever is shifted to the end of the introduction opening by means of the securing element, that is, when the actuating device is transferred from its active position into its passive position. The forced coupling between the actuating device and the locking device has, as explained, the advantage that the locking device can be transferred automatically into its locked state when the actuating device is transferred from its active position into its passive position by the stop element being attached to the securing element. On the other hand, this forced coupling has furthermore the great advantage that, when the stop element is attached to the securing element, the locking device can only be transferred into its unlocked state if the actuating device can also be transferred into its active position, which is only possible if the contact element is relieved of load, that is, if no retaining force or securing force is transmitted between the stop element and the securing element. Inadvertent removal of the stop element from the securing element when the stop element is under load can thereby be effectively prevented.

An embodiment of a securing device according to the invention is characterised in that it has at least one stop element according to an embodiment of the invention, which stop element can be connected to the person to be secured. According to an advantageous embodiment of this securing device, two such stop elements are provided, as well as a coupling device which is coupled to the locking devices of the two stop elements in such a manner that the coupling device blocks the locking device of one stop element in its locked state when the locking device of the other stop element is in its unlocked state. This means in particular that only one stop element can ever be removed from the securing element and changed over.

Further important features and advantages of embodiments of the invention can be found in the dependent claims, the drawings and the associated description of the figures using the drawings.

It is self-evident that the features which are mentioned above and those which are still to be explained below can be used not only in the combination specified in each case, but also in other combinations or alone without departing from the framework of the present invention.

BRIEF DESCRIPTION OF THE DRAWINGS

Preferred exemplary embodiments of the invention are shown in the drawings and are explained in more detail in the following description, with the same reference symbols referring to the same or similar or functionally identical components.

In the figures.

DETAILED DESCRIPTION OF THE INVENTION

Figure 1:
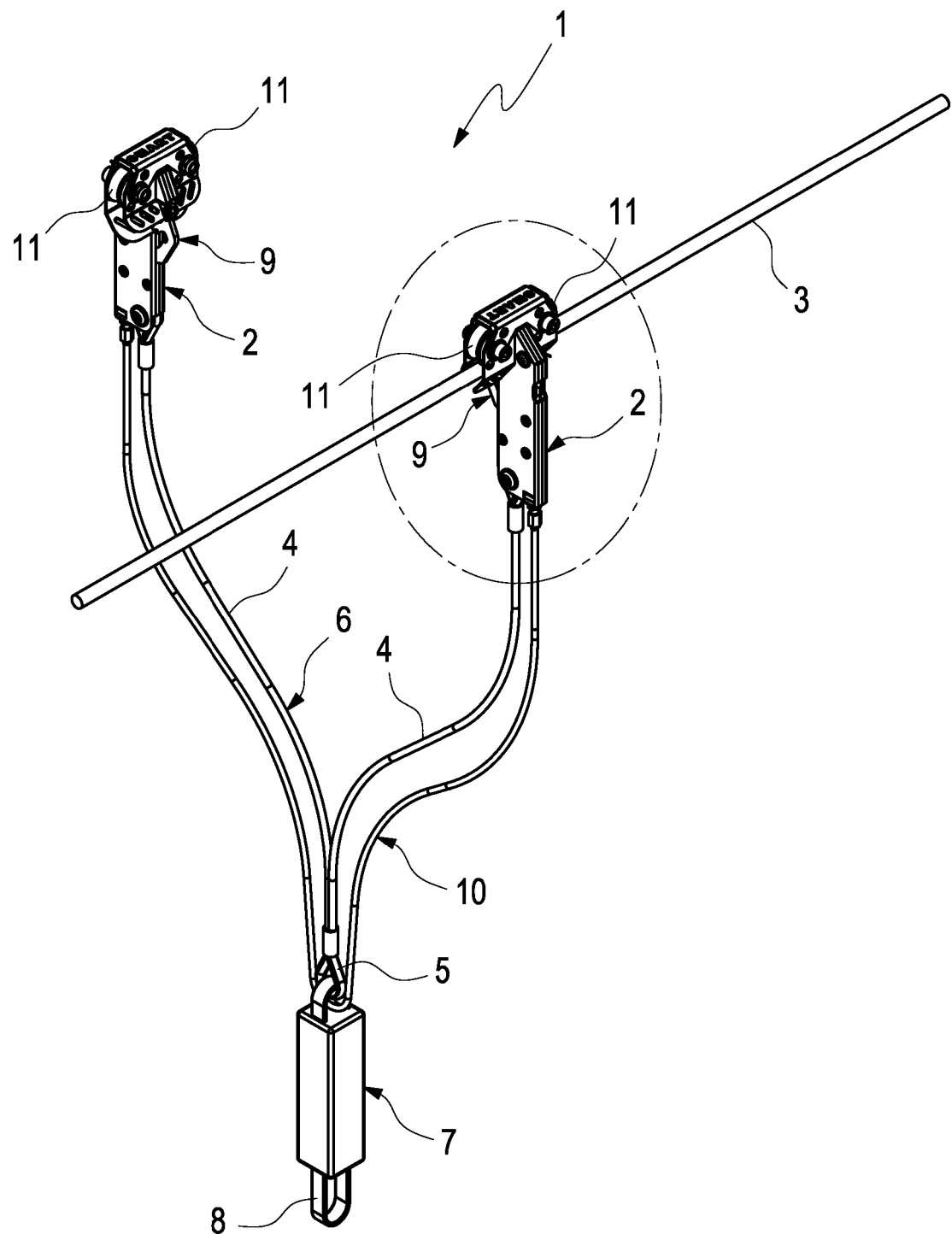
FIG. 1 schematically shows a perspective view of a securing device.

According to FIG. 1 a securing device 1, which is used to prevent a person (not shown) from falling, comprises two stop elements 2. Each stop element 2 is configured in such a manner that it can be releasably attached to a stationary securing element 3. In FIG. 1, only the stop element 2 which is shown on the right is attached to the securing element 3, which is configured as a rope here, whereas the stop element 2 which is shown on the left is removed from the securing element 3. Furthermore, each stop element 2 is in each case connected securely to a connecting element 4, with it being possible for the respective connecting element 4 to be connected to the respective person to secured. In the embodiment shown in FIG. 1 the connecting element 4 is a rope. In the embodiments of FIGS. 2 to 6 the connecting element 4 can be formed by a strap. It is clear that the connecting elements 4 can also be configured as a chain or the like.

In the example according to FIG. 1, the two connecting elements 4 form a common loop 5 with which they can together be attached to the person to be secured. The two connecting elements 4 in this case thus form a common connecting component 6. Two completely separate connecting elements 4 can likewise be used. The connecting elements 4 or the connecting component 6 can in principle be fastened directly to a safety strap on the person to be secured by means of the loop 5 with the aid of a carabiner or the like. In the present case a fall arrester 7 is also provided, which can be included in the securing device 1. The connecting elements 4 or the connecting component 6 are/is fastened to the fall arrester 7, which for its part can be fastened by means of a loop 8 to the respective persons or by means of carabiners to his/her safety strap.

Each stop element 2 has a locking device 9. The respective locking device 9 can be shifted between an unlocked state and a locked state. In the unlocked state the respective stop element 2 can be attached to the respective securing element 3 or released from it. In contrast to this, the respective stop element 2 cannot be released from the respective securing element 3 to which it is attached without destroying it, when it is in the locked state.

The securing device 1 described here also comprises a coupling device 10. This is coupled to the locking device 9 of the two stop elements 2. This coupling takes place in such a manner that the coupling device 10 blocks the locking device 9 of one stop element 2 in its locked state when the locking device 9 of the other stop element 2 is in the unlocked state. This means that, when one locking device 9 is unlocked, the other locking device 9 is blocked in its locked state by means of the coupling device 10 and cannot be unlocked again. The coupling device 10 operates purely mechanically, in particular hydraulically or pneumatically. In principle, a coupling device 10 which operates electrically is also conceivable. However, embodiments which operate without an external energy source are preferred.

The stop elements 2 which are shown in FIG. 1 are configured as rollers which have in each case two rolls 11 which are arranged one after the other and with which the respective stop element 2 can roll on the securing element 3 which is configured as a rope. In the preferred embodiments of FIGS. 2 to 6, the respective stop element 2 is configured like or as a carabiner. According to FIGS. 2 to 4 the respective stop element 2 has in each case a contact element 11, which interacts with the securing element 3 or comes into contact with the latter when the stop element 2 is attached to the securing element 3. In the preferred examples shown, this contact element 11 is configured as a roll, which is also given the reference symbol 11 below, that is, is also designated roll 11. It is clear that any other contact element 11 can be used instead of a roll, for example a type of slide stone or just a hook contour in the stop element 2. The use of the roll 11 as the contact element 11 ensures minimal wear and convenient operation. The preferred variant with the contact element 11 which is configured as a roll is explained in more detail in the description below. Where appropriate, the embodiments made with reference to the roll 11 can be transferred analogously to any other contact element 11.

The following description of FIGS. 2 to 6 relates to the subregion of the securing device 1 which is enclosed in FIG. 1 with a dashed line. In other words, the structure of an individual stop element 2 is explained in more detail. It is clear that in principle both stop elements 2 of the securing device 1 are configured to have an identical construction, but they do not have to.

According to FIGS. 2 to 6 he respective stop element 2 has a housing 12, which is essentially fabricated from formed sheet metal parts. The housing 12 has two lateral faces 13, between which a cover 14 is arranged. Only one of the mutually opposite lateral faces 13 can be seen in the sectional illustration. The roll 11 is mounted rotatably, in particular by means of a ball bearing, in an upper region of the housing 12. In this upper region there is also a receiving space 15 for receiving the respective securing element 3. In order to be able to introduce the respective securing element 3 into the receiving space 15 or in order to be able to pull the securing element 3 out of the receiving space 15 again, the receiving space 15 or the stop element 2 is equipped with an introduction opening 16. The housing 12 is as a whole configured like a hook by the receiving space 15 and the introduction 16. The stop element 2 in particular forms a carabiner.

The connecting element 4 is fastened in a lower region of the housing 12. In the example shown, the connecting element 4 consists of two separate straps 17 which are in each case fastened to both lateral faces 13 independently of each other, for example by means of separate bolts 18. The two straps 17 can be sewn together underneath the housing 12, in particular in such a manner that they can form a loop, which cannot be seen here. In the preferred embodiment shown here, the coupling device 10 comprises a force-transmitting element 19 which leads from the locking device 9 of one stop element 2 to the locking device 9 of the other stop element 2. This force-transmitting element 19 can expediently be placed inside the hose, as a result of which it is adequately protected from damage during normal use of the securing device 1. The force-transmitting element 19 is preferably a Bowden cable, which usually consists of a 20, which is stable under compressive force, and a cable 21, which is stable under tensile force and can also be called a core 21.

According to FIGS. 2 to 6, the coupling device 10 comprises a blocking lever 22 for the locking device 9 of the respective stop element 2. This blocking lever 22 is mounted on the housing 12 in such a manner that it can pivot about a blocking lever pivot axis 23 which runs perpendicularly to the plane of the drawing in FIGS. 2 to 6. The blocking lever 22 can be pivoted into a blocking position in which it blocks the respective locking device 9 in its locked state. In the embodiment which operates with the Bowden cable as the force-transmitting element 19, the cable 21 is fixed to the respective blocking lever 22. The sleeve 20 is supported on the housing 12.

The locking device 9 in this case has a lock 24, which can be pivoted about a lock pivot axis 25, which runs perpendicularly with respect to the drawing plane in FIGS. 2 to 6. The lock 24 can be pivoted between a locked position which is associated with the locked state of the locking device 9 and an unlocked position which is associated with the unlocked state of the locking device 9. In FIGS. 2, 3, 5 and 6 the lock 24 is in its locked position, whereas in FIG. 4 it is in its unlocked position.

Figure 2:
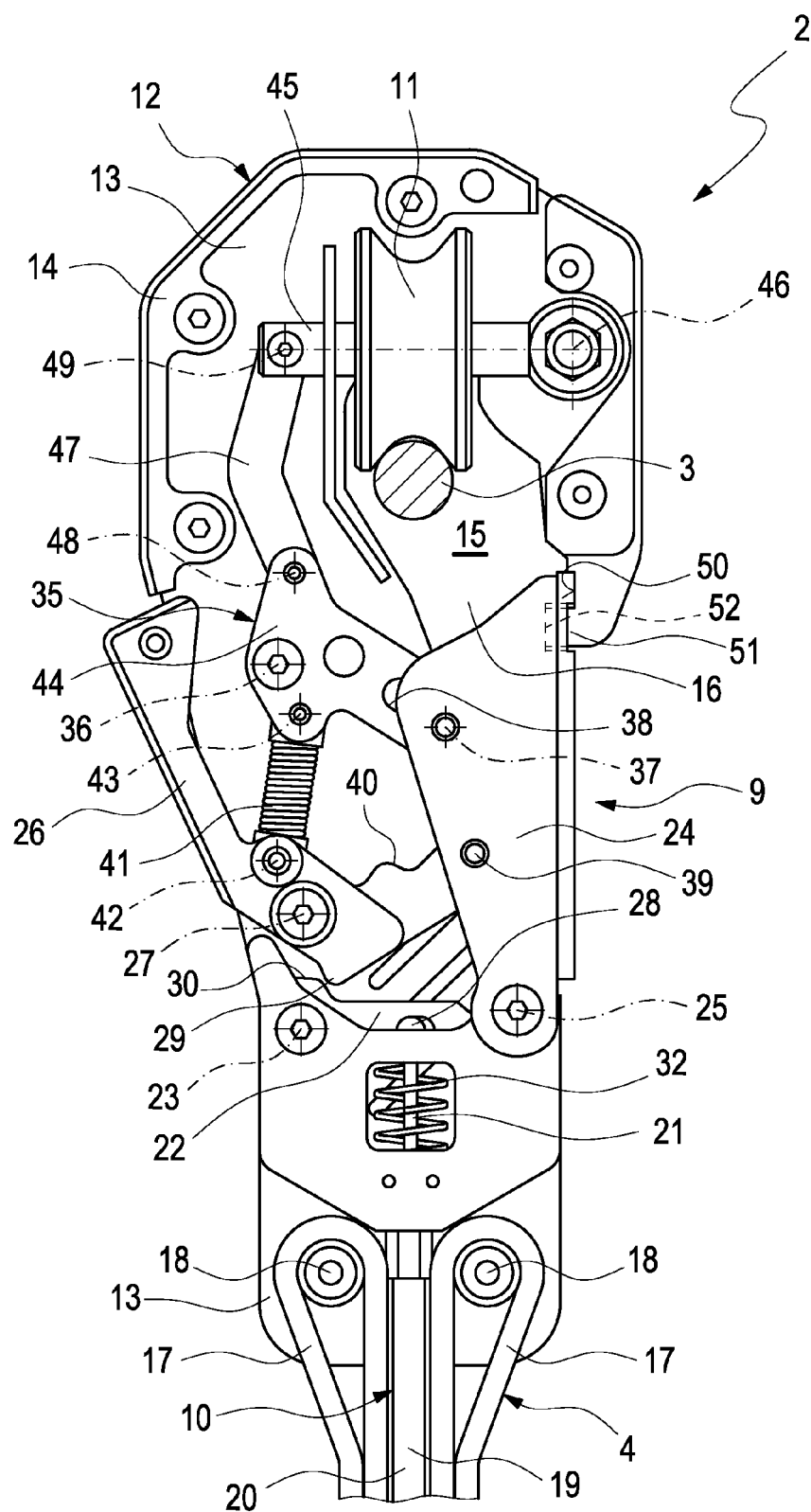
FIGS. 2 to 4 schematically show in each case a side view of a stop element in different operating states, in partial section, FIGS. 5 and 6 schematically show in each case an enlarged sectional view as in FIGS. 2 to 4 in the region of a blocking lever, in different operating states.
Figure 3:
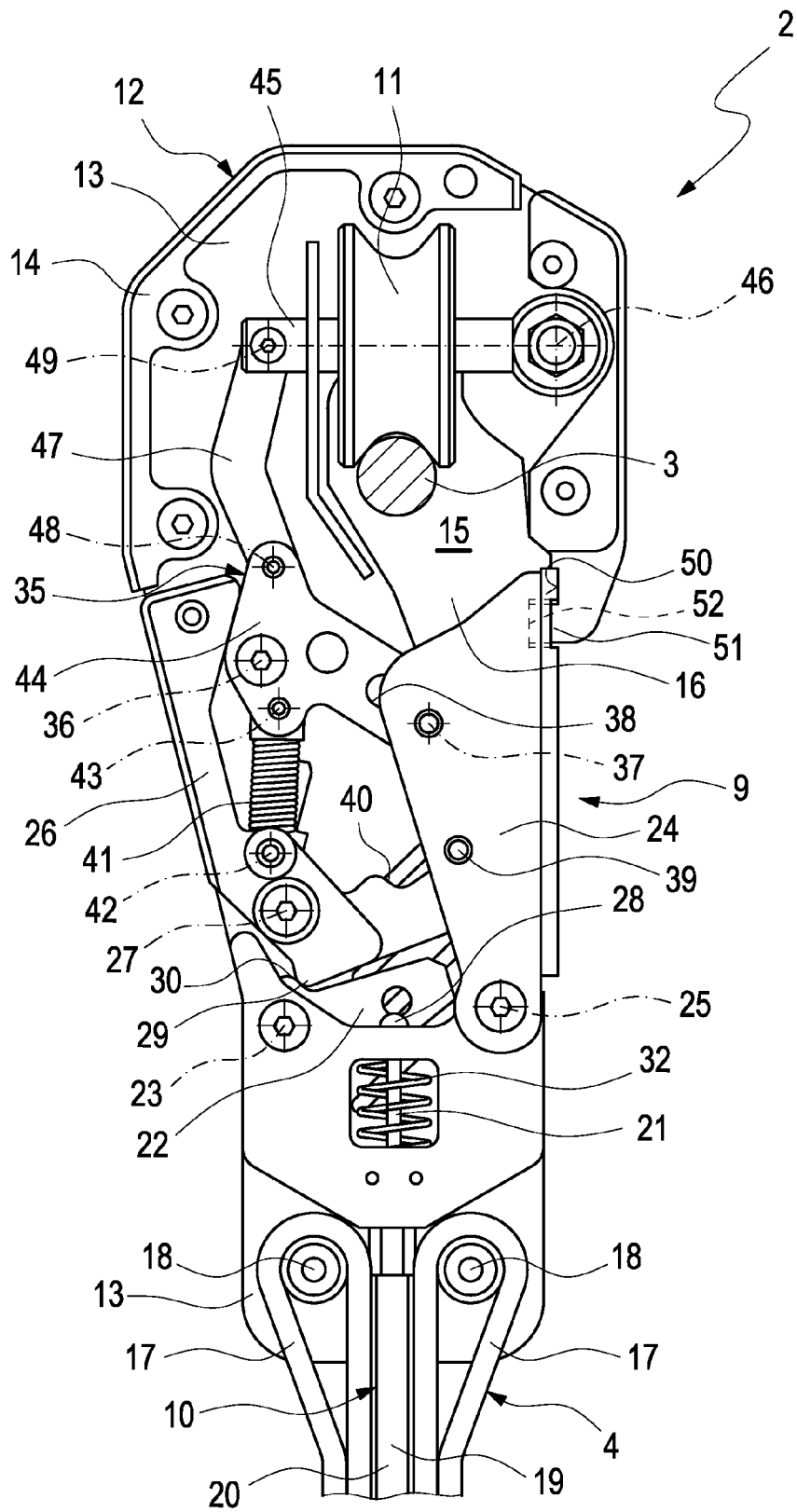
Figure 4:
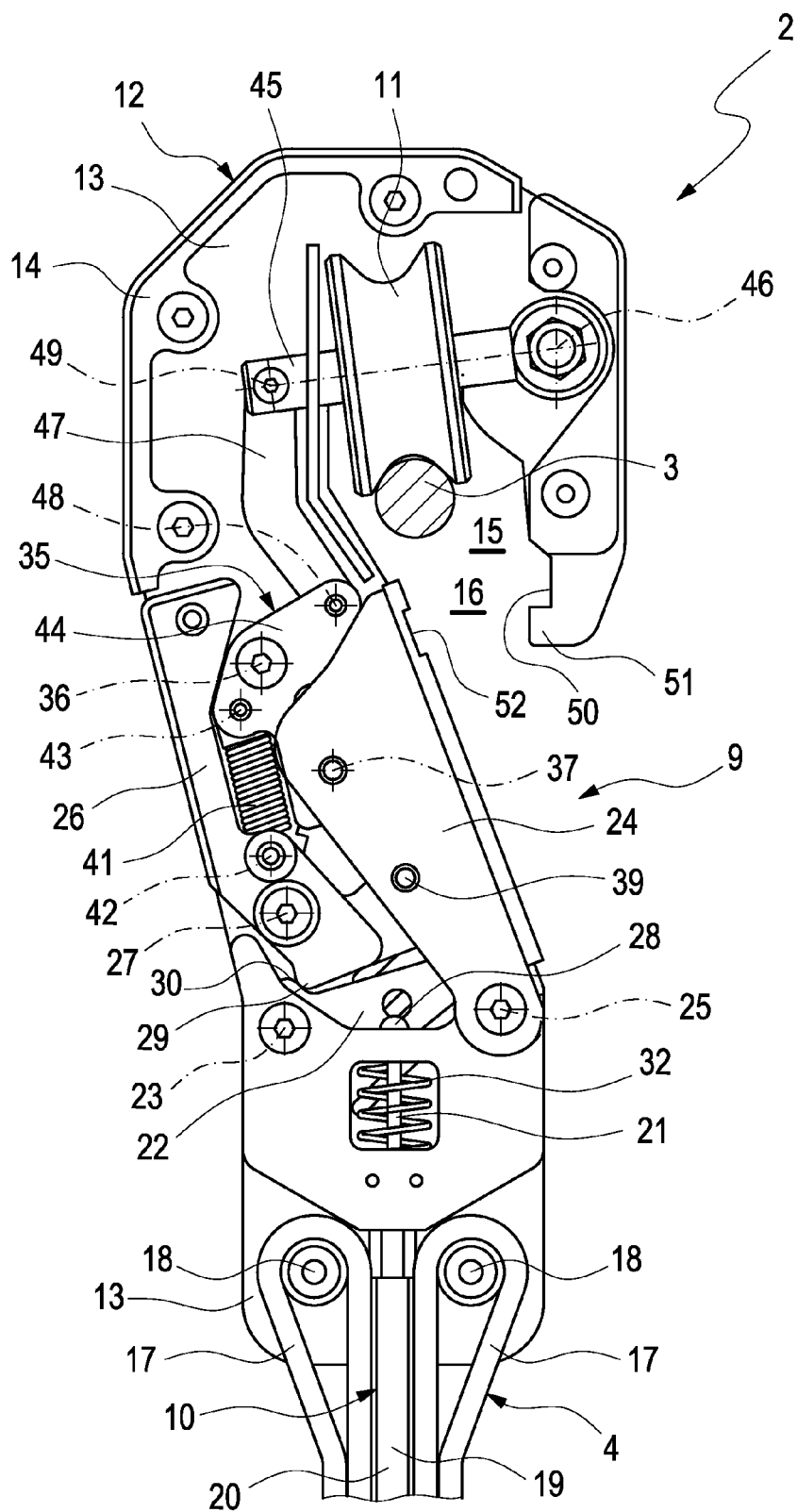
Figure 5:
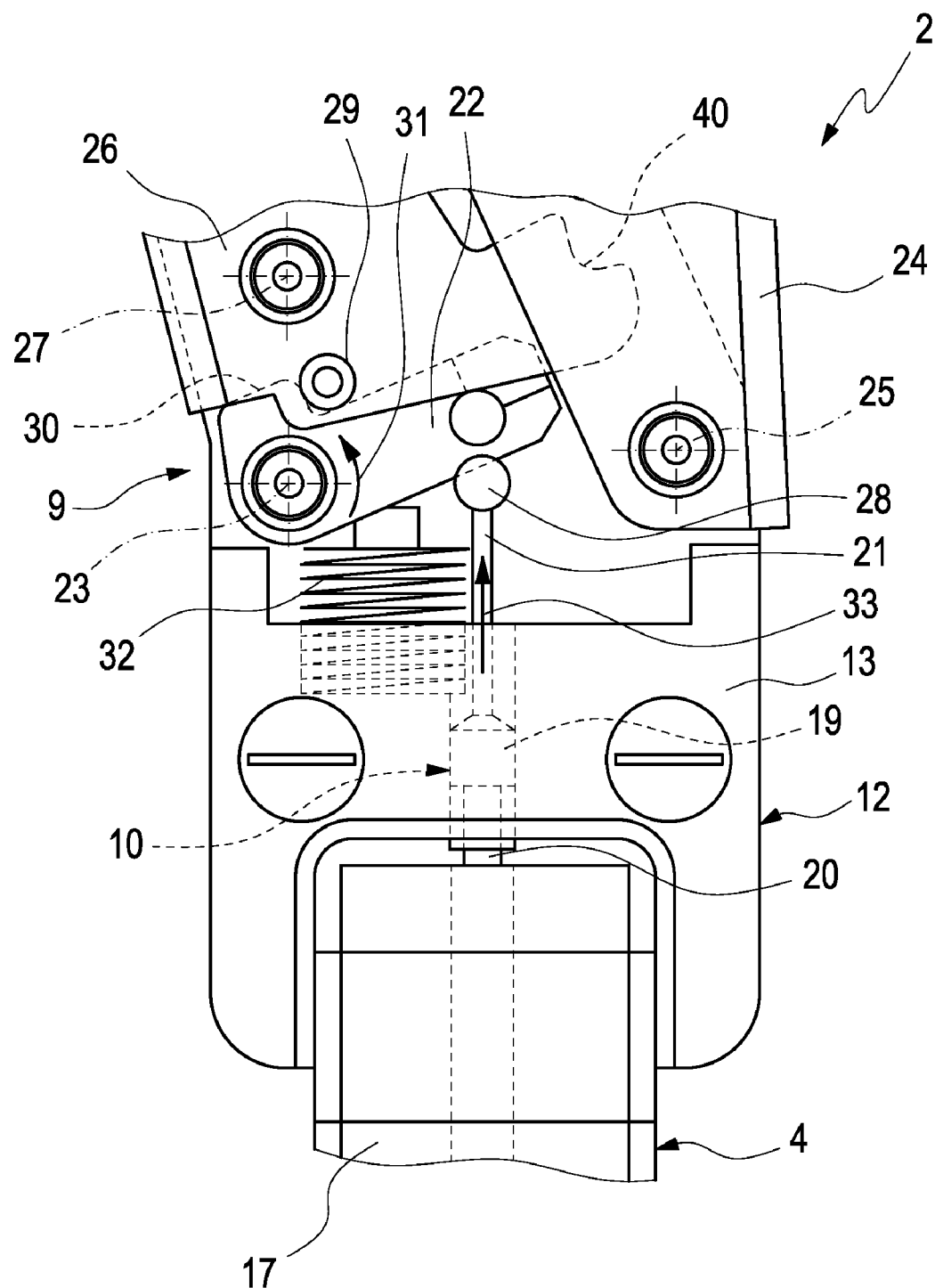

Furthermore, the locking device 9 in this case comprises a securing lever 26, which can be pivoted about a securing lever pivot axis 27, which runs perpendicularly with respect to the drawing plane in the illustrations of FIGS. 2 to 6. The securing lever 26 can be pivoted between a securing position, in which it blocks the lock 24 in its locked position, and an unsecuring or releasing position, in which it allows the lock 24 to pivot between its locked position and its unlocked position. In order to realise this interaction between the securing lever 26 and the lock 24, in this case a control bolt 39 is formed by way of example on the lock 24, which bolt interacts with a control link 40 which is formed on the securing lever 26. In FIGS. 3, 4 and 5 the securing lever 26 is in its unsecuring position, whereas in FIGS. 2 and 6 it is in its securing position.

In the embodiments shown here, the blocking lever 22 now interacts with the securing lever 26. This means that when the blocking lever 22 is in its blocking position it blocks the securing lever 26 in its securing position. As the lock 24 is blocked in its locked position by the securing lever 26 when the securing lever 26 is in its securing position, the associated locking device 9 is in its locked state and cannot be removed from the securing element 3.

Alternatively, it is likewise possible in principle to arrange or configure the blocking lever 22 in such a manner that it interacts directly with the lock 24 so that when the blocking lever 22 is in its blocking position it blocks the lock 24 in its locked position. It is likewise conceivable in principle to configure or arrange the blocking lever 22 in such a manner that it interacts with both the lock 24 and the securing lever 26 at the same time.

The force-transmitting element 19 couples the two blocking levers 22 of the two locking devices 9 to each other in such a manner that a pivoting action of one blocking lever 22 pivots the other blocking lever 22 into its blocking position. In the embodiment shown here, the securing lever 26 is provided for operating the blocking lever 22. Accordingly, the securing lever 26 in this case interacts in a suitable manner with the associated blocking lever 22. Pivoting the securing lever 26 into its unsecuring position thus leads to a pivoting action of the blocking lever 22, which pivots the other blocking lever 22, which is coupled by means of the force-transmitting element 19, into its blocking position. It is clear that a drive coupling can in principle also be provided between the lock 24 and the blocking lever 22. However, the variant which is proposed here is preferred, in which the operation of the securing lever 26 operates the blocking lever 22.

Figure 6:
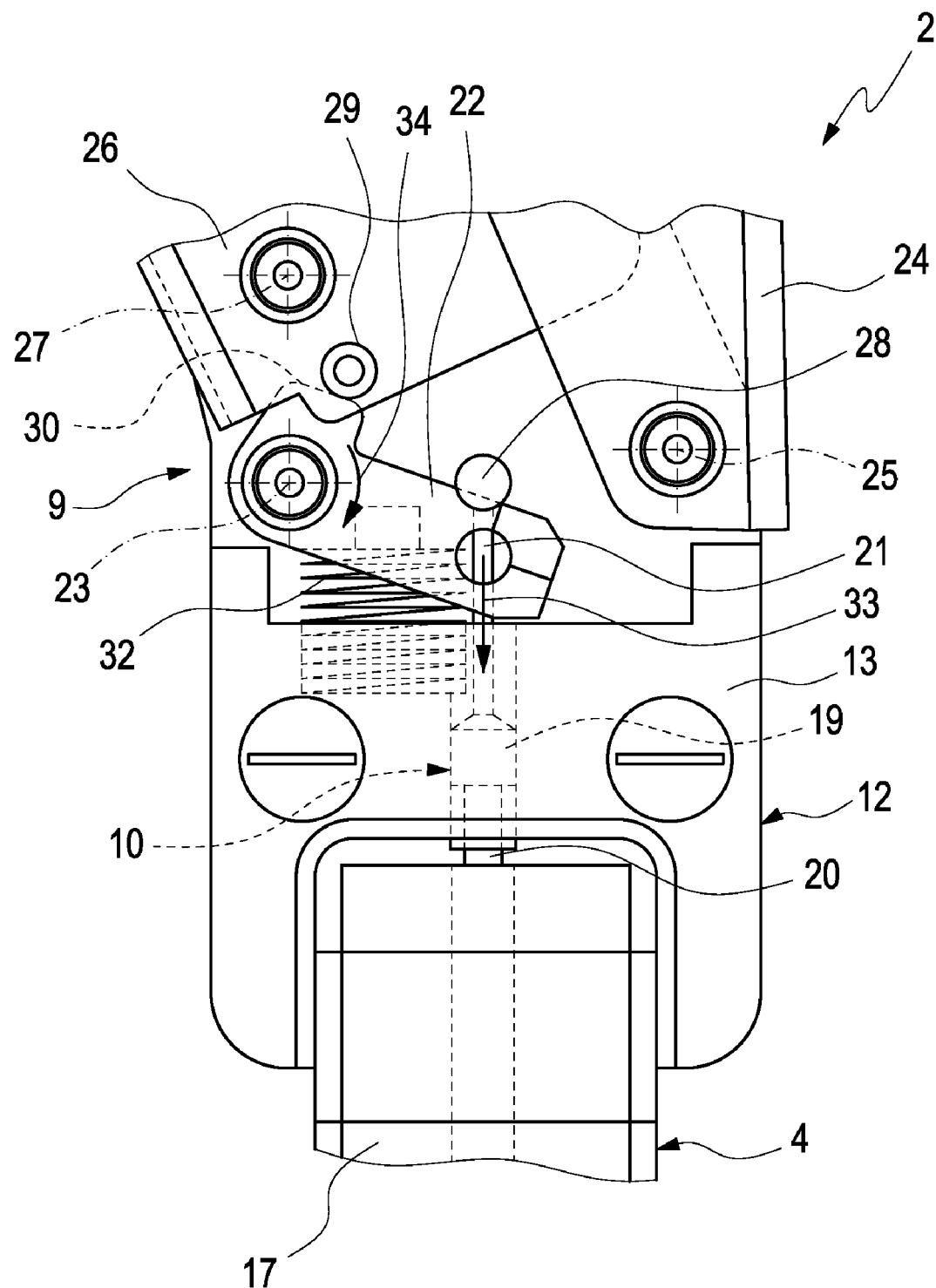

FIGS. 5 and 6 show the different pivoting processes of the blocking lever 22. A connecting member 28, by means of which the cable 21 of the respective Bowden cable 19 is fixed to the blocking lever 22, is reproduced in the relative position in which this connecting member 28 is when the blocking lever 22 assumes a rest position. The respective blocking lever 22 assumes its rest position when both locking devices 9 in each case have their locked state.

In FIG. 5 the securing lever 26 is pivoted into its unsecuring position. The securing lever 26 has a control bolt 29 which interacts with a control link 30 which is formed on the blocking lever 22. FIGS. 2 to 4 show a variant in which a control contour 29 is formed on the securing lever 26 instead of a control bolt, which control contour fulfils the same function. The control link 30 and the control bolt 29 are matched to each other in such a manner that the pivoting of the securing lever 26 into its unsecuring position causes the blocking lever 22 to be pivoted in such a manner that it introduces a tensile force into the force-transmitting element 19. In FIG. 5 the pivoting movement takes place anticlockwise, in a direction of rotation 31 which is indicated by an arrow. This rotational movement of the blocking lever 22 can be supported by a pressure spring 32. The tensile force which is introduced into the force-transmitting element 19 with the aid of the blocking lever 22 which is pivoted in this manner is indicated here by an upwardly pointing arrow and designated 33.

FIG. 6 shows virtually the other end of the force-transmitting element 19 which transmits the tensile force 33 to the blocking lever 22 of the other locking device 9. Accordingly, this tensile force 33 is directed downwards in FIG. 6. As a result the blocking lever 22 pivots in the opposite direction of rotation which is symbolised here by an arrow and designated 34. This other direction of rotation 34 is directed clockwise in this case. As long as the securing lever 26 assumes its securing position, the control bolt 29 and the control contour 30 also interact. The control contour 30 is moved into the shifting path of the control bolt 29, as a result of which the latter bears against the control contour 30 as against a stop. As a result the pivotability of the securing lever 26 is blocked so that the latter can no longer be pivoted out of its securing position. Accordingly, the blocking lever 22 pivots out of its rest position into its blocking position in one direction of rotation 34 in order to block the respective locking device 9, whereas it is pivoted out of its rest position in the opposite direction of rotation 31 when it is pivoted.

According to FIGS. 2 to 4, the respective locking device 9 moreover comprises an actuating device 35, which can be shifted between an active position and a passive position or between an active state and a passive state. In the active position, the actuating device 35 blocks the locking device 9 in its unlocked state. In its passive position, the actuating device 35 allows the locking device 9 to be shifted into its locked state. Furthermore, the actuating device 35 is configured in such a manner that it is forced from the active position into the passive position when the stop element 2 is attached to the securing element 3. It is particularly expedient to integrate the contact element 11, that is, in particular the roll 11 in the actuating device 35. In other words, the roll 11 forms a part of the actuating device 35. The integration takes place in such a manner that, when the stop element 2 is attached to the securing element 3, the contact or pressure of the securing element 3 on the contact element 11 leads to the actuating device 35 being transferred into its passive position. The exact functioning of the actuating device 35 is explained in more detail below using FIGS. 2 to 4, with the exemplary, concrete structure of the actuating device 35 which is shown here being described in detail first.

According to FIGS. 2 to 4, the actuating device 35 comprises a bearing lever 44 which is mounted on the housing 12 such that it can pivot about a bearing lever pivot axis 36, which in FIGS. 2 to 4 runs perpendicularly with respect to the drawing plane. The bearing lever 44 is drive-connected to the locking device 9. The actuating device 35 is thus forcedly coupled to the locking device 9 by means of the bearing lever 44. To this end, a control bolt 37 which is formed on the lock 24 interacts with a control link 38 which is formed on the bearing lever 44. This forced coupling causes the bearing lever 44 to pivot when the lock 24 is operated between two end positions, of which one is associated with the passive state of the actuating device 35, which is also referred to below as the passive end position, and the other is associated with the active state of the actuating device 35, which is also referred to below as the active end position. In the example shown, the lock 24 has the further control bolt 39 mentioned above, which interacts with the further control link 40 which is formed on the securing lever 26. This interaction between the control bolt 39 and the control link 40 is moreover designed here in such a manner that when the lock 24 is in its unlocked position it blocks the securing lever 26 in its unsecuring position. The bearing lever 44, which is pivoted into its active end position, finally directly blocks the lock 24 in its unlocked position and indirectly blocks the securing lever 26 in its unsecuring position by means of the unlocked lock 24. This state is reproduced in FIG. 4.

In the passive end position of the bearing lever 44 shown in FIGS. 2 and 3, the bearing lever 44 allows the lock 24 to pivot into its locked position and indirectly allows the securing lever 26 to pivot into its securing position.

The actuating device 35 moreover has a contact lever 45 which in this case bears the contact element 11, that is, the roll 11. The contact lever 45 can in principle itself also form the contact element 11. The contact lever 45 is mounted on the housing 12 such that it can pivot about a contact lever pivot axis 46, which runs perpendicularly with respect to the drawing plane. At its end which is remote from the bearing point 46, the contact lever 45 is drive-coupled to the bearing lever 44 by means of a coupling lever 47. The coupling lever 47 is connected such that it can pivot to the bearing lever 44 by means of a bearing point 48 and to the bearing lever 45 by means of a bearing point 49.

When the actuating device 35 is in the active position (FIG. 4), the contact lever 45 with the roll 11 is positioned in such a manner that it forces the actuating device 35 into its passive position when the respective stop element 2 is attached to the respective securing element 3. To this end, the roll 11 on the contact lever 45 projects into the introduction opening 16 in order to shorten the shifting path of the securing element 3 in the introduction opening 16 to such an extent that the securing element 3, when introduced by means of proper contact against the roll 11, forces the contact lever 45 into operation and thus pivots it about its pivot axis 46. This means that the roll 11 with the contact lever 45 is pivoted by means of the securing element 3 into the starting position of FIGS. 2 and 3, which is associated with the passive position of the actuating device 35. In this starting position of the contact lever 45 or of the roll 11 or in the passive position of the actuating device 35, the roll 11 forms the fixed end of the introduction opening 16. The securing element 3 causes the roll 11 to be pushed or the roll 11 to be shifted into the introduction opening 16 when the stop element 2 is hooked on. The contact lever 45 pivots at the latest when the stop element 2 is loaded, which results in the actuating device 35 being forced into its passive position. The bearing lever 44 also pivots in the process by means of the coupling lever 47. On the other hand, the lock 24 then releases the securing lever 26 so that this can also pivot into its securing position. This type of construction has the result that the lock 24 is forced into its locked position when the stop element 2 is hooked onto the securing element 3, whereas at the same time the securing lever 26 is also transferred into its securing position. This means that effective securing of persons can be ensured immediately after the stop element 2 is placed on the securing element 3.

The bearing lever 44 is pre-tensioned with the aid of a pressure spring drive 41 into its respective end position, that is, either into the active end position or into the passive end position. The bearing lever 44 and pressure spring drive 41 form part of an over-centre linkage of the actuating device 35. The said pressure spring drive 41 has an over-centre point position both for the active position and for the passive position. The pressure spring drive 41 is supported on one side on the securing lever 26 at a bearing point which is referred to with 42. The pressure spring drive 41 is supported on the other side on the bearing lever 44 at a bearing point which is referred to with 43. Alternatively, the pressure spring drive 41 could have its bearing point 42 on the housing 12 instead of on the securing lever 26.

In the passive position of the actuating device 35 shown in FIGS. 2 and 3, the bearing point 43 on the bearing lever side is on the right of an imaginary straight line which goes through the bearing point 42 on the securing lever side and through the bearing lever pivot axis 36. In contrast to this, the bearing point 43 on the bearing lever side in the active position of the actuating device 35 shown in FIG. 4 is on the left of the said straight line, which goes through the bearing point 42 on the securing lever side and through the bearing lever pivot axis 36. In order to get from one position to the other, the distance between the two bearing points 42, 43 of the pressure spring drive 41 must therefore be shortened as far as the centre point position in which the two bearing points 42, 43 and the bearing lever pivot axis 36 are on a common straight line. Accordingly, the two end positions of the bearing lever 44, that is, the active position and the passive position of the actuating device 35, are stable over-centre point positions. In order to get from one position to the other position, the said labile centre point position must be overcome. Until then, the bearing lever 44 must be pivoted against the restoring force of the pressure spring drive 41. When the centre point position is overcome, the pressure spring drive 41 then drives the bearing lever 44 automatically into the respective other position.

In the embodiments shown here the lock 24 is configured as a directly manually operated lock 24 which can be operated for example using forefinger and middle finger. At the same time, the securing lever 26 is configured here as a directly manually operated securing lever 26, which can for example be operated with a thumb. The securing lever 26 and the lock 24 are in this case arranged on mutually opposite sides of the respective stop element 2, as a result of which operation with one hand is possible.

An unlocking or locking process is explained again briefly below with reference to FIGS. 2 to 4. FIG. 2 shows the locked state of the locking device 9. The lock 24 has its locked position. It can be seen that the lock 24 in its locked position closes the introduction opening 16 so that it is not possible to remove the stop element 2 from the securing element 3 without destroying it. The securing lever 26 assumes its securing position. The actuating device 35 is in its passive position. The blocking lever 22 is in its rest position. The securing element 3 is in the receiving space 15. In particular the roll 11 bears against the securing element 3.

In the preferred example shown, a stop 50 is formed on the housing 12 in the region of the introduction opening 16, on which stop the lock 24 comes to bear when in its locked position, at an end region, which is remote from the lock pivot axis 25, of the lock 24. In the preferred embodiment shown here the housing 12 also has a hook 51 in the region of the stop 50, which hook engages in a hook socket 52 which is formed on the lock 24, when the lock 24 assumes its locked position. This means that a closed force path is formed inside the housing 12, in which the lock 24 is included. This means that the hook-shaped stop element 2 obtains particularly high stability for securing.

To release the securing device, the user first operates the securing lever 26 according to FIG. 3, in order to pivot the latter into the unsecuring position. The blocking lever 22 is forced into operation, as a result of which it is pivoted into the blocking position. Then the user operates the lock 24 according to FIG. 4 and pivots this into the unlocked position. During this pivoting process, the bearing lever 44 is forced along, as the lock 24 is in this case provided for driving the bearing lever 44. The contact lever 45 is also driven to pivot about its pivot axis 46 by means of the pivoting of the bearing lever 44. This means that the roll 11 is pivoted through the receiving space 15 and drives the securing element 3 out of the receiving space 15. This is however only possible when the stop element 2 is essentially unloaded, that is, is not needed for securing the person. Under load, that is, if for example the weight of the person is transmitted via the stop element 2 and thus via the roll 11 to the securing element 3, the lock 24 cannot be pivoted into its unlocked position by means of the forced coupling between the actuating device 35 and the locking device 9. This means that inadvertent opening of the loaded stop element 2 can be effectively prevented.

When the stop element 2 is attached to the securing element 3, the securing element 3 then pushes the contact lever 45, as a result of which the actuating device 35 snaps automatically into its passive position after the centre point position of the bearing lever 44 has been overcome. On the one hand the lock 24 is forced into its locked position. On the other hand, the securing lever 26 is also released, as a result of which it can be pivoted into the securing position. The securing lever 26 can be spring-loaded. In the example the securing lever 26 is driven by the pressure spring drive 41.

In a high rope course, a wire rope with a certain diameter is for example used as the securing element 3. This securing rope 3 is often called a lifeline. In contrast to this, a multiplicity of fastening ropes are used for constructing the high rope course, which are for example hemp ropes or wire ropes with a plastic sheath. In any case, these other ropes have a greater outer diameter than the securing rope 3. The dimensioning of the stop element 2 and in particular of the introduction opening 16 is expediently designed in a targeted manner such that the stop element 2 can only be hooked onto the securing rope 3 and not onto one of the other, thicker ropes. This also means that the operational safety of the securing device 1 or of the high rope course can be improved.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A stop element for a securing device releasably attachable to a securing element and connectable to a person for preventing the person from falling, the stop element comprising:

a locking device which can be shifted between an unlocked state, in which the stop element can be attached to the securing element and can be released therefrom, and a locked state, in which the stop element cannot be released from the securing element without destroying the stop element;

wherein the locking device has an actuating device which can be shifted between an active position and a passive position and when in its active position blocks the locking device in its unlocked state and can be transferred into its passive position when the stop element is attached to the securing element, in the passive position the actuating device allows the locking device to be shifted into its locked state; and wherein the actuating device includes at least one contact element against which the securing element comes to bear when the stop element is attached thereto, the contact element forms part of the actuating device in such a manner that the actuating device is shifted into its passive position when the securing element contacts the contact element;

wherein the actuating device has a contact lever, which forms at least part of the contact element and which is forced to pivot when the stop element is attached to the respective securing element; and wherein the contact lever is arranged pivotably in such a manner that, when the actuating device is in the active position, the contact element shortens a shifting path over which the securing element must travel through an introduction opening in order to bear against the contact element, in comparison to a position which the contact lever assumes when the actuating device is in the passive position.

2. Stop element according to claim 1, wherein the actuating device has a bearing lever which is mounted such that it can pivot and which is drive-coupled to the locking device.

3. Stop element according to claim 2, wherein the bearing lever is drive-coupled to a lock of the locking device, which lock can be pivoted between a locked position which is associated with the locked state of the locking device and an unlocked position which is associated with the unlocked state of the locking device.

4. Stop element according to claim 3, wherein the bearing lever is drive-coupled to a securing lever of the locking device, which can be pivoted between a securing position which blocks the lock in its locked position and an unsecuring position which allows the lock to be pivoted between its locked position and its unlocked position.

5. Stop element according to claim 1, wherein the contact element includes a roller which is mounted rotatably on the contact lever.

6. Stop element according to claim 1, wherein the actuating device has a bearing lever which is mounted such that it can pivot and which is drive-coupled to the locking device and has a coupling lever which connects the bearing lever to the contact lever.

7. The stop element according to claim 1, further comprising a receiving space for receiving the securing element, the receiving space including an introduction opening through which the securing element passes to attach and detach the stop element from the securing element, the locking device further including a lock which can be pivoted between a locked position in which the lock extends completely across and blocks the introduction opening preventing removal of the securing element from the receiving space through the introduction opening and an unlocked position in which the lock does not block the introduction opening and does not extend across the introduction opening; and wherein when the actuating device is in its active position, the actuating device blocks the locking device in its unlocked position.

8. A stop element for a securing device releasably attachable to a securing element and connectable to a person for preventing the person from falling, the stop element comprising:

a locking device which can be shifted between an unlocked state, in which the stop element can be attached to the securing element and can be released therefrom, and a locked state, in which the stop element cannot be released from the securing;

wherein the locking device has an actuating device which can be shifted between an active position and a passive position and when in its active position blocks the locking device in its unlocked state and can be transferred into its passive position when the stop element is attached to the securing element, in the passive position the actuating device allows the locking device to be shifted into its locked state; and wherein the actuating device includes at least one contact element against which the securing element comes to bear when the stop element is attached thereto, the contact element forms part of the actuating device in such a manner that the actuating device can be shifted into its passive position when the securing element contacts the contact element; and wherein the actuating device includes an over-centre linkage constructed in such a manner that the active position and the passive position are in each case stable over-centre point positions which can be reached by means of a labile intermediate position.

9. A stop element for a securing device releasably attachable to a securing element and connectable to a person for preventing the person from falling, the stop element comprising:

a locking device which can be shifted between an unlocked state, in which the stop element can be attached to the securing element and can be released therefrom, and a locked state, in which the stop element cannot be released from the securing element without destroying the stop element;

wherein the locking device has an actuating device which can be shifted between an active position and a passive position and when in its active position blocks the locking device in its unlocked state and can be transferred into its passive position when the stop element is attached to the securing element, in the passive position the actuating device allows the locking device to be shifted into its locked state;

wherein the actuating device includes at least one contact element against which the securing element comes to bear when the stop element is attached thereto, the contact element forms part of the actuating device in such a manner that the actuating device is shifted into its passive position when the securing element contacts the contact element;

wherein the actuating device has a bearing lever which is mounted such that it can pivot and which is drive-coupled to the locking device;

wherein the bearing lever is drive-coupled to a lock of the locking device, which lock can be pivoted between a locked position which is associated with the locked state of the locking device and an unlocked position which is associated with the unlocked state of the locking device; and further comprising a housing, the lock of the locking device moveable relative to the housing between its locked and unlocked positions, wherein the lock of the locking device has a hook socket into which a hook which is formed on the housing engages when the lock assumes its locked position.

10. A stop element for a securing device releasably attachable to a securing element and connectable to a person for preventing the person from falling, the stop element comprising:

a locking device which can be shifted between an unlocked state, in which the stop element can be attached to the securing element and can be released therefrom, and a locked state, in which the stop element cannot be released from the securing element without destroying the stop element;

wherein the locking device has an actuating device which can be shifted between an active position and a passive position and when in its active position blocks the locking device in its unlocked state and can be transferred into its passive position when the stop element is attached to the securing element, in the passive position the actuating device allows the locking device to be shifted into its locked state;

wherein the actuating device includes at least one contact element against which the securing element comes to bear when the stop element is attached thereto, the contact element forms part of the actuating device in such a manner that the actuating device is shifted into its passive position when the securing element contacts the contact element further comprising a receiving space for receiving the securing element, the receiving space including an introduction opening through which the securing element passes to attach and detach the stop element from the securing element, the locking device further including a lock which can be pivoted between a locked position in which the lock extends completely across and blocks the introduction opening preventing removal of the securing element from the receiving space through the introduction opening and an unlocked position in which the lock does not block the introduction opening and does not extend across the introduction opening; and wherein when the actuating device is in its active position, the actuating device blocks the locking device in its unlocked position; and wherein when the at least one contact element bears against the securing element and the actuating device is shifted into its passive position, the lock is driven from the unlocking position to the locking position.

11. Stop element according to claim 10, wherein the actuating device has a contact lever, which forms at least part of the contact element and which is forced to pivot when the stop element is attached to the respective securing element.

12. Stop element according to claim 10, wherein the actuating device is forcedly coupled to the locking device in such a manner that when the locking device is shifted into its unlocked state, the actuating device is forced into its active position.

13. Securing device according to claim 10, wherein the at least one stop element comprises at least two stop elements; and further comprising a coupling device coupled to the locking devices of the at least two stop elements in such a manner that, when the locking device of one stop element is in the unlocked state, it blocks the locking device of the other stop element in its locked state.

* * * * *